(12) United States Patent
Wyatt et al.

(10) Patent No.: US 10,581,996 B2
(45) Date of Patent: Mar. 3, 2020

(54) DERIVATION OF ONTOLOGICAL RELEVANCIES AMONG DIGITAL CONTENT

(71) Applicant: Pavlov Media, Inc., Champaign, IL (US)

(72) Inventors: Bartow Wyatt, Champaign, IL (US); Mark Scifres, Champaign, IL (US)

(73) Assignee: Pavlov Media, Inc., St. Champaign, IL (US)

( * ) Notice: Subject to any disclaimer, the term of this patent is extended or adjusted under 35 U.S.C. 154(b) by 276 days.

(21) Appl. No.: 14/192,355

(22) Filed: Feb. 27, 2014

(65) Prior Publication Data

US 2014/0244647 A1 Aug. 28, 2014

Related U.S. Application Data

(60) Provisional application No. 61/770,163, filed on Feb. 27, 2013, provisional application No. 61/770,186, filed on Feb. 27, 2013, provisional application No. 61/770,204, filed on Feb. 27, 2013, provisional application No. 61/770,211, filed on Feb. 27, 2013.

(51) Int. Cl.
| | |
|---|---|
| *G06F 16/00* | (2019.01) |
| *H04L 29/08* | (2006.01) |
| *G06F 16/9535* | (2019.01) |
| *G06F 16/957* | (2019.01) |

(52) U.S. Cl.
CPC ...... *H04L 67/2842* (2013.01); *G06F 16/9535* (2019.01); *G06F 16/9574* (2019.01); *H04L 67/1097* (2013.01)

(58) Field of Classification Search
CPC ............... G06F 3/0482; G06F 3/04842; G06F 17/30864; G06F 17/30867; G06F 17/3053; G06F 17/30876; G06F 17/3089; G06F 3/04847; G06F 3/165; G06F 15/16; G06F 17/30174; G06F 17/30011; G06F 17/30029; G06F 17/30035; G06F 17/30053; G06F 16/9535; G06F 16/9574; H04L 67/2842; H04L 67/1097
See application file for complete search history.

(56) References Cited

U.S. PATENT DOCUMENTS

| | | | |
|---|---|---|---|
| 6,055,536 A | 4/2000 | Shimakawa | |
| 6,415,323 B1 | 7/2002 | McCanne | |
| 7,904,930 B2 | 3/2011 | Dhodapkar | |
| 7,958,457 B1* | 6/2011 | Brandenberg | ...... G06F 16/9535 715/789 |
| 8,060,926 B1 | 11/2011 | Ebrahimi | |
| 8,370,460 B1 | 2/2013 | Khakpour | |
| 8,473,358 B1 | 6/2013 | Schuster | |

(Continued)

*Primary Examiner* — Anh Ly
(74) *Attorney, Agent, or Firm* — James E. Eakin

(57) ABSTRACT

System for ontological evaluation and filtering of digital content evaluates metadata associated with content available from an original content server. The metadata is filtered and evaluated by a processing cluster to develop correlation among content for the formation of content "channels". In general, the filtering and evaluation criteria use predictive algorithms and seek to identify content that is likely to be desired for download by the consumers located at, for example, a particular multi-dwelling unit. The content, once so correlated, is then grouped or aggregated into "channels".

1 Claim, 8 Drawing Sheets

(56) References Cited

U.S. PATENT DOCUMENTS

| | | | |
|---|---|---|---|
| 8,499,088 B1 | 7/2013 | Breau | |
| 8,610,730 B1* | 12/2013 | Li | G06F 3/1454 |
| | | | 345/520 |
| 2002/0007413 A1 | 1/2002 | Garcia-Luna-Aceves | |
| 2003/0130994 A1* | 7/2003 | Singh | G06F 16/9535 |
| | | | 707/E17.008 |
| 2003/0165241 A1 | 9/2003 | Franksdonk | |
| 2003/0174648 A1 | 9/2003 | Wang | |
| 2003/0236837 A1 | 12/2003 | Johnson | |
| 2004/0049598 A1 | 3/2004 | Tucker | |
| 2004/0098589 A1 | 5/2004 | Appenzeller | |
| 2005/0203924 A1* | 9/2005 | Rosenberg | G06F 17/30696 |
| | | | 707/E17.014 |
| 2005/0216457 A1* | 9/2005 | Walther | G06F 17/30696 |
| | | | 707/E17.109 |
| 2005/0271072 A1* | 12/2005 | Anderson | H04L 12/6418 |
| | | | 370/419 |
| 2006/0018317 A1 | 1/2006 | Jimmel | |
| 2006/0143702 A1 | 6/2006 | Hisada | |
| 2007/0070066 A1* | 3/2007 | Bakhash | G06F 3/04815 |
| | | | 345/419 |
| 2007/0104326 A1 | 5/2007 | Feigenbaum | |
| 2007/0121832 A1 | 5/2007 | Ghoshal | |
| 2007/0124789 A1 | 5/2007 | Sachson | |
| 2007/0179945 A1 | 8/2007 | Marston | |
| 2007/0180496 A1* | 8/2007 | Fransdonk | G06Q 20/027 |
| | | | 726/3 |
| 2007/0192872 A1* | 8/2007 | Rhoads | G06F 3/017 |
| | | | 726/26 |
| 2007/0238507 A1 | 10/2007 | Sobel | |
| 2007/0266169 A1 | 11/2007 | Chen | |
| 2007/0288470 A1 | 12/2007 | Kauniskangas | |
| 2007/0294126 A1 | 12/2007 | Maggio | |
| 2008/0022377 A1 | 1/2008 | Chen | |
| 2008/0109362 A1* | 5/2008 | Fransdonk | G06Q 30/06 |
| | | | 705/51 |
| 2008/0192820 A1* | 8/2008 | Brooks | H04N 7/17318 |
| | | | 375/240.02 |
| 2008/0306871 A1 | 12/2008 | Grannan | |
| 2009/0055267 A1 | 2/2009 | Roker | |
| 2009/0083279 A1* | 3/2009 | Hasek | H04L 67/2823 |
| | | | 707/E17.014 |
| 2009/0099891 A1 | 4/2009 | Cohen | |
| 2009/0125951 A1 | 5/2009 | Agricola | |
| 2009/0158346 A1 | 6/2009 | Zer | |
| 2009/0198997 A1 | 8/2009 | Yeap | |
| 2009/0208005 A1 | 8/2009 | Kusakawa | |
| 2009/0210899 A1 | 8/2009 | Lawrence-Apfelbaum | |
| 2009/0265378 A1* | 10/2009 | Dahl | G06F 16/80 |
| | | | 707/E17.055 |
| 2009/0276771 A1* | 11/2009 | Nickolov | G06F 9/4856 |
| | | | 717/177 |
| 2010/0036954 A1 | 2/2010 | Sakata | |
| 2010/0121914 A1 | 5/2010 | Jeon | |
| 2010/0177891 A1* | 7/2010 | Keidar | H04N 5/913 |
| | | | 380/200 |
| 2010/0223364 A1 | 9/2010 | Wei | |
| 2010/0241753 A1 | 9/2010 | Garbajs | |
| 2010/0250341 A1* | 9/2010 | Hauser | G06F 17/30867 |
| | | | 707/769 |
| 2010/0268361 A1* | 10/2010 | Mantel | G06F 17/30749 |
| | | | 707/E17.102 |
| 2011/0040826 A1 | 2/2011 | Chadzelek | |
| 2011/0126230 A1* | 5/2011 | Dow | H04N 7/173 |
| | | | 725/39 |
| 2011/0153941 A1 | 6/2011 | Spatscheck | |
| 2011/0231475 A1 | 9/2011 | Van der Merwe | |
| 2011/0258049 A1* | 10/2011 | Ramer | G06Q 30/02 |
| | | | 705/14.66 |
| 2011/0264649 A1* | 10/2011 | Hsiao | G06N 5/022 |
| | | | 707/722 |
| 2011/0270964 A1 | 11/2011 | Huang | |
| 2011/0276993 A1* | 11/2011 | Ferguson | H04N 7/173 |
| | | | 725/30 |
| 2011/0283018 A1 | 11/2011 | Levine | |
| 2012/0005584 A1 | 1/2012 | Seago | |
| 2012/0109902 A1 | 5/2012 | Rozensztejn | |
| 2012/0114302 A1* | 5/2012 | Randall | G11B 27/105 |
| | | | 386/241 |
| 2012/0158985 A1 | 6/2012 | Patten | |
| 2012/0190386 A1 | 7/2012 | Anderson | |
| 2012/0198075 A1* | 8/2012 | Crowe | H04L 67/2847 |
| | | | 709/226 |
| 2012/0239725 A1 | 9/2012 | Hartrick | |
| 2012/0278335 A1 | 11/2012 | Bentkofsky | |
| 2012/0289147 A1 | 11/2012 | Raleigh | |
| 2012/0304072 A1* | 11/2012 | Mercuri | G06Q 10/00 |
| | | | 715/745 |
| 2013/0054756 A1 | 2/2013 | Do | |
| 2013/0054822 A1 | 2/2013 | Mordani | |
| 2013/0103785 A1* | 4/2013 | Lyon | H04N 21/2385 |
| | | | 709/217 |
| 2013/0204415 A1 | 8/2013 | Fregley | |
| 2013/0212060 A1* | 8/2013 | Crouse | G06F 16/367 |
| | | | 707/602 |
| 2013/0260796 A1 | 10/2013 | Hasek | |
| 2013/0276142 A1 | 10/2013 | Peddada | |
| 2013/0278335 A1 | 10/2013 | Kuehlwein | |
| 2013/0301301 A1 | 11/2013 | Fischer | |
| 2013/0339519 A1 | 12/2013 | Lientz | |
| 2014/0075004 A1* | 3/2014 | Van Dusen | H04L 41/04 |
| | | | 709/223 |
| 2014/0101523 A1 | 4/2014 | Bar-Nahum | |
| 2014/0164352 A1* | 6/2014 | Denninghoff | H03H 9/02622 |
| | | | 707/711 |
| 2014/0245359 A1 | 8/2014 | De Foy | |
| 2015/0237567 A1 | 8/2015 | Xue | |
| 2015/0172357 A1 | 11/2015 | Olrog | |

\* cited by examiner

DERIVATION OF ONTOLOGICAL RELEVANCIES AMONG DIGITAL CONTENT

FIELD OF THE INVENTION

The present invention relates generally to the field of internet content delivery systems and methods, and more particularly relates methods, systems and techniques for automatically selecting and caching content at edge servers to provide significantly faster content delivery to, for example, multi-dwelling units.

BACKGROUND OF THE INVENTION

Fast delivery of internet content has long been desired by users of the internet. However, bandwidth limitations have historically existed which seriously limited the ability of the internet infrastructure to meet the ever-increasing demands of users for more content, delivered more quickly.

The limitations of the existing internet infrastructure are nowhere more apparent than the exploding demand for fast downloading of video content from the internet. However, video requires substantially greater bandwidth than most other content and, as a result, such consumer demand has placed substantial strain on the internet infrastructure.

While services such as Akamai have attempted to place limited, pre-designated content at the edge of the internet, such efforts are typically limited to icons, images and ads, and do not include the actual content that users desire to see.

As a result, there has long been a need for a system which can effectively "speed up" delivery of desired content without substantial delay caused by the inherent bandwidth limitations associated with most internet feeds.

SUMMARY OF THE INVENTION

The present invention provides an efficient system and method for identifying, caching, and delivering at high speed, the content that users in, for example, a multiple-dwelling unit are likely to want to download based on prior usage characteristics augmented by trend data the system aggregates across a plurality of similar and dissimilar multiple-dwelling units and the users within.

In an aspect of the invention, the system comprises local content storage and an associated local network appliance deployed proximate to, or within, a multi-dwelling unit such as an office building, an apartment building, a dormitory, or other business or residential structure. Although, for convenience of illustration, the following description assumes a multi-dwelling unit in many cases, in some embodiments the local appliance can serve either groups of consumers distributed geographically, or only a single consumer. The local network appliance communicates with consumer devices, and also communicates over the internet with original content servers and, importantly in some embodiments, a central processing cloud.

The central processing cloud cooperates with the local network appliance to identify content that consumers desire to download. The central processing cloud includes structures and methods for identifying content likely to be downloaded by the consumer devices, and communicates over the internet with the server where the desired content is originally maintained. The metadata associated with the original content is communicated to the central processing cloud, and a copy of the original content along with its associated metadata are downloaded and stored. The metadata is used by a processing cluster, using a variety of filtering and evaluation criteria, to develop ontological correlations, or relevancies, among the content. In general, the filtering and evaluation criteria use predictive algorithms and seek to identify content that is likely to be desired for download by the consumers located at, for example, a particular multi-dwelling unit. The content, once so correlated, is then grouped or aggregated into "channels". In an embodiment, the content comprising at least one channel is then downloaded to the local network appliance and stored on the local content storage associated with the particular dwelling unit.

A high speed local network connects the local network appliance and its associated local content storage, where the channel of content is stored, to the consumer devices. When a consumer at that multi-dwelling unit seeks to download data that is included within the channel, the data is essentially immediately available, without any of the delays and latency associated with conventional internet downloads, and thus the consumer receives the desired content at extremely fast data rates.

The central processing cloud includes functionality for identifying the origin of requests for content, using data received from the local network appliance. In at least some embodiments, personal data associated with such requests is "blurred out" or anonymized at the local appliance level, to minimize the risk of personal data being compromised. However, in at least some embodiments, it is possible either to use the data without such blurring, or to blur the data at the remote, central processing cloud. The central processing cloud also provides functionality for complying with releases of content that are time-stamped.

Geographical distribution, and updating, of the channels to their respective cohesive local networks, where the channels are based on ontological relevancy, is accomplished by the network links between the central processing cloud and the local network appliance. In some instances, load on the local cohesive network is sufficiently large that more than one local network appliance and associated content store is appropriate. In such cases, a regional appliance and associated content store can be used in some embodiments, and a content delivery node may also be used in some embodiments.

It is therefore one object of the present invention to provide a local content server with associated storage for delivering requested content at accelerated data rates, substantially higher than conventional internet service providers.

It is a further object of the present invention to evaluate requests for internet content originating from a location, and, based on such requests, develop groups of content that anticipate future requests from that location.

These and other objects of the present invention will be apparent from the following detailed description, taken together with the appended Figures.

THE FIGURES

DETAILED DESCRIPTION OF THE INVENTION

Figure 1:
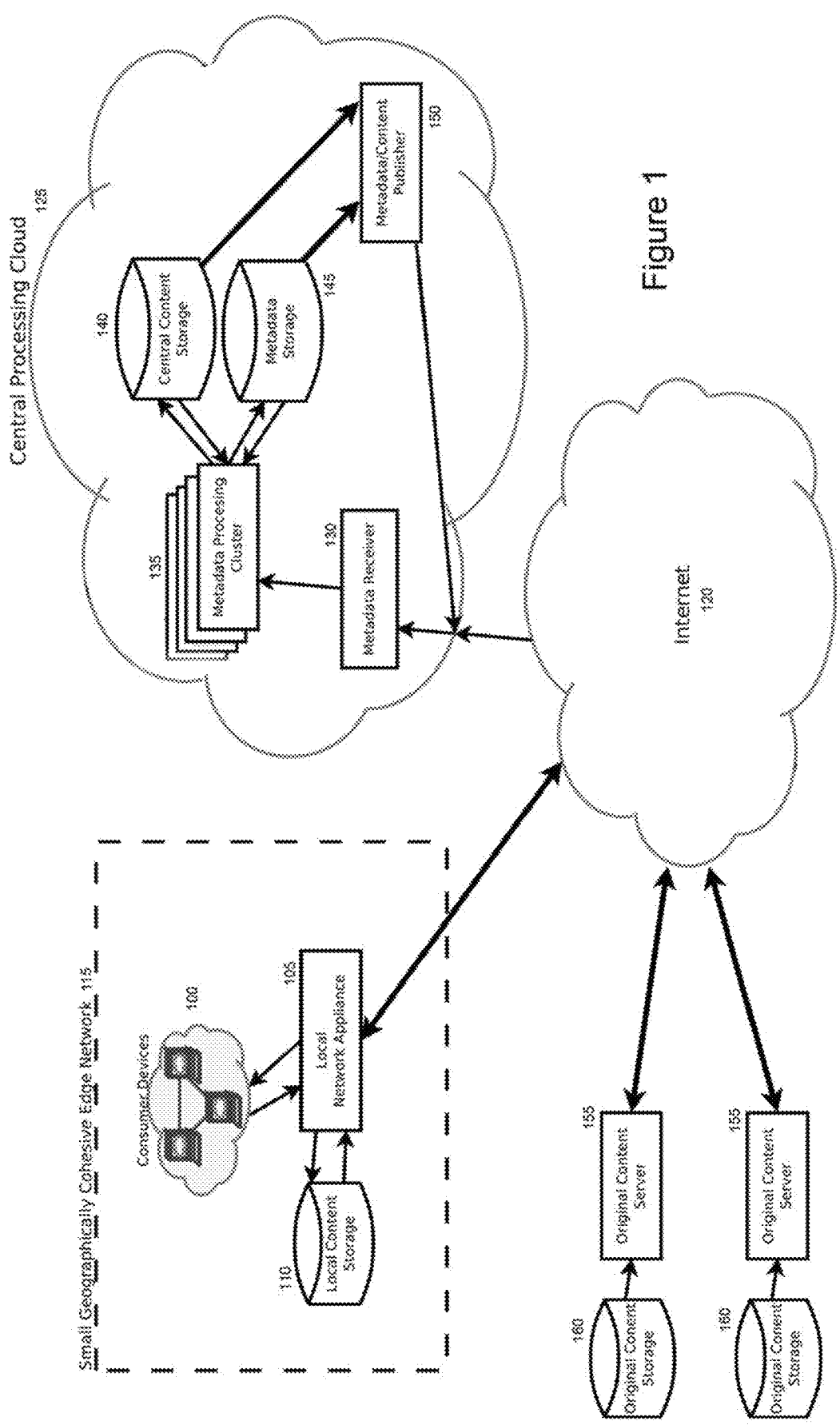
FIG. 1 shows a basic arrangement of system for practicing an embodiment of one method in accordance with the present invention.

Referring first to FIG. 1, a group of one or more consumer devices 100, a local network appliance 105, and an associated local content storage 110 form a small, geographically cohesive edge network 115. In at least some embodiments, the consumer devices can be any form of network-connected device capable of requesting network content, such as laptop computers, desktop computers, smartphones, game consoles, etc. The local network appliance 105 can be, in at least some embodiments, a computer server or other device capable of redirecting requests to a web proxy and controlling communications with the internet cloud 120, and also capable of managing data flow with the local content storage 110.

In a typical arrangement, the local network appliance 105 receives requests for content from the consumer devices 100, with the two being linked by a high bandwidth local area network connection. If the content resides on the local content storage 110, the content is served from there back to the consumer device 100 making the request. It will be appreciated that, if the requested content is already stored on the local content storage device 110, then the content is served to the consumer device with essentially no latency and at the maximum data rate permitted by the local area network connection. That data rate is typically much faster than the internet infrastructure, and thus the user experience for the consumer is that the requested content arrives essentially instantaneously.

It will be appreciated, then, that an objective of some aspects of the present invention is to ensure that, as often as possible, the content that any consumer 100 requests already resides on local content storage 110. For at least some embodiments, the remainder of the system of the present invention is designed to achieve such a result. For purposes of the present discussion, the content stored on the local storage 110 will be considered to be grouped or aggregated into one or more "channels", with the composition of each "channel" developed as the result of the past usage characteristics of all users operating consumer devices 100 connected to any geographically connected edge network 115 associated with the same central processing cloud 125.

For some embodiments of the invention, in the event that the requested content is not on the local content storage, the appliance 105 communicates over the internet cloud 120 with a central processing cloud 125, which forms part of the system of the present invention in at least some embodiments. For those embodiments in which the central processing cloud 125 exists, the central processing cloud comprises a metadata receiver 130, a metadata processing cluster 135, central content storage 140, metadata storage 145, and a metadata/content publisher 150. The metadata receiver 130, processing cluster 135 and publisher 150 can all be regarded as software functionalities operating on one or more servers, which functions are explained in greater detail hereinafter.

In general, the metadata receiver receives consumer requests for content from appliance 105, and forwards those requests to processing cluster 135. Among other functions, the processing cluster determines whether the requested content is already stored on central content store 140. If the requested content was not on local content storage 110, but is on central content store 140, the content may, in some embodiments, be served back to the local network appliance 105 via publisher 150 and internet cloud 120. In other embodiments, content that is not on the local content storage is retrieved from the original content server.

The download of stored content from the remote central processing cloud can be particularly desirable in multiple instances. For example, where the internet infrastructure connection between the central processing cloud and the local network appliance is carrier grade, such that it has bandwidth in the range of 10,000 Mbps, the high bandwidth can be utilized to make spot deliveries of content to local network appliances. In addition, direct downloads from the central processing cloud can be desirable where delivery is made through non-traditional means, such as a multi-cast via satellite. Such non-point-to-point delivery approaches can provide substantial efficiencies compared to traditional internet backhauls.

In addition, the content is evaluated for addition to the "channel" of aggregated content stored on the local content store 110, as explained in greater detail hereinafter.

In addition to determining whether requested content already resides on the central storage 140, the metadata processing cluster also stores the metadata on metadata storage 145, together with various analytics, also as described in greater detail hereinafter.

In the event that the requested content is not on the local storage 110, the consumer's request is forwarded to the server which hosts the original URL that comprises the consumer's request. The content is retrieved from the original server 155 and its associated original content storage 160, and then sent to the user 100 via the cloud 120 and network appliance 105. In addition, the content is evaluated for storage either on central storage 140, local storage 110, or both, and the associated metadata is likewise evaluated for storage on metadata storage 145 as explained in greater detail hereinafter.

From the simplified system diagram of FIG. 1, those skilled in the art can appreciate that a system offering very high speed throughput of internet content has been described, when such content has been channelized for storage on, in the first instance, local content storage 110, and, if not there, then on central content storage 140.

Figure 2:
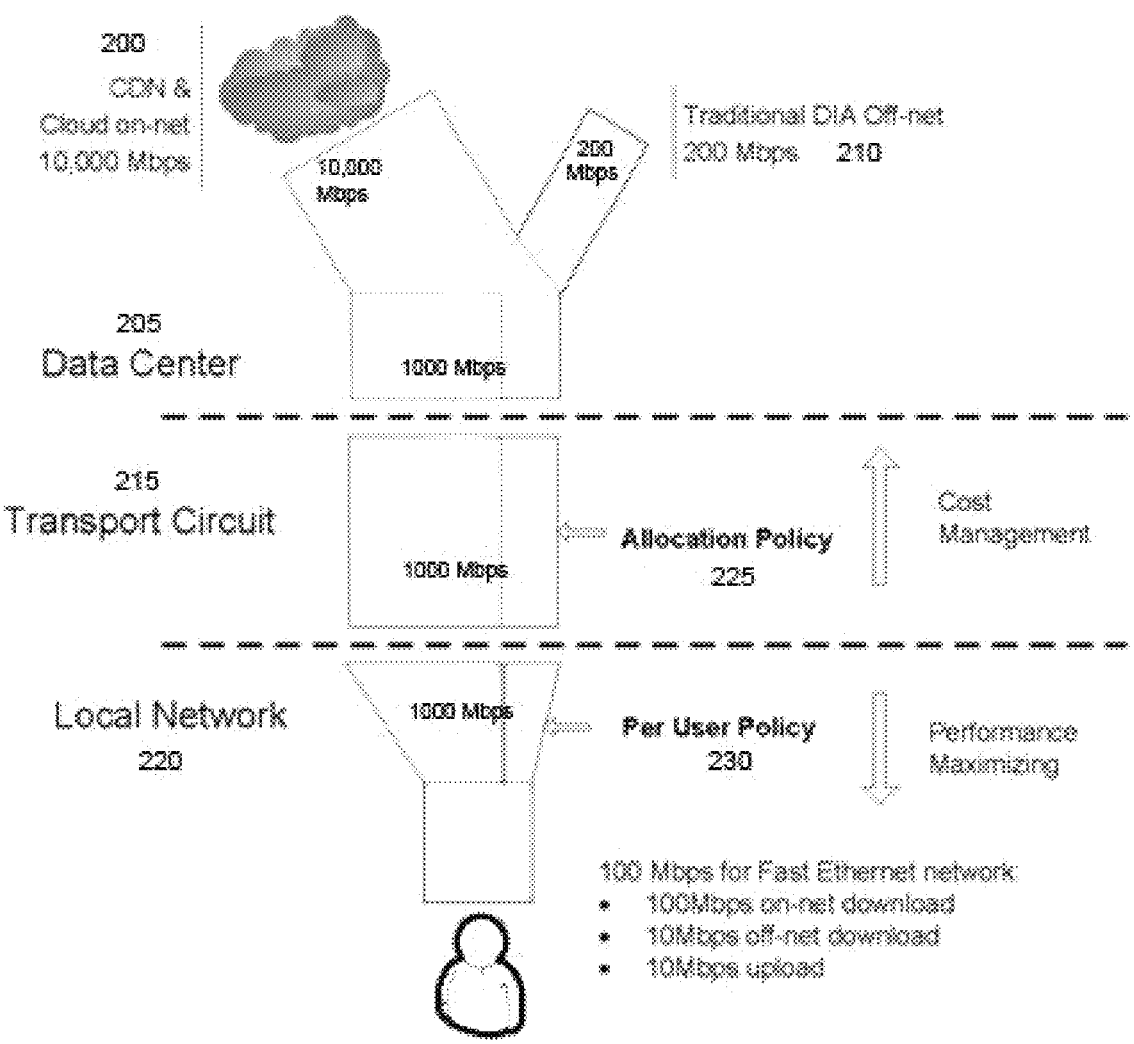
FIG. 2 illustrates a tiered flow of internet content in accordance with the present invention.

Referring next to FIG. 2, an exemplary illustration of the data transfer relationships between various layers of the infrastructure of an embodiment of the present invention can be better appreciated. In particular, for data resident on the central cloud storage of FIG. 1, illustrated as "on net" at 200 in FIG. 2, the download speeds from the central cloud storage to a local data center 205 (such as the local network appliance 105 in FIG. 1) can approach 10,000 Mbps depending upon implementation, whereas traditional content downloads, for content "off" the system of the present invention as indicated at 210 in FIG. 2, typically operates at a more leisurely 200 Mbps. Continuing with the exemplary arrangement of FIG. 2, the data center 205 may operate at data rates in the range of 1000 Mbps, with a similar data rate for the associated local transport circuit 215 and local network 220. In addition, allocation policies 225 and user policies 230 can be implemented at the transport circuit and local network, respectively, to permit cost management together with selection of performance levels. Upload speeds in such an embodiment may be in the range of 10 Mbps.

Figure 3:
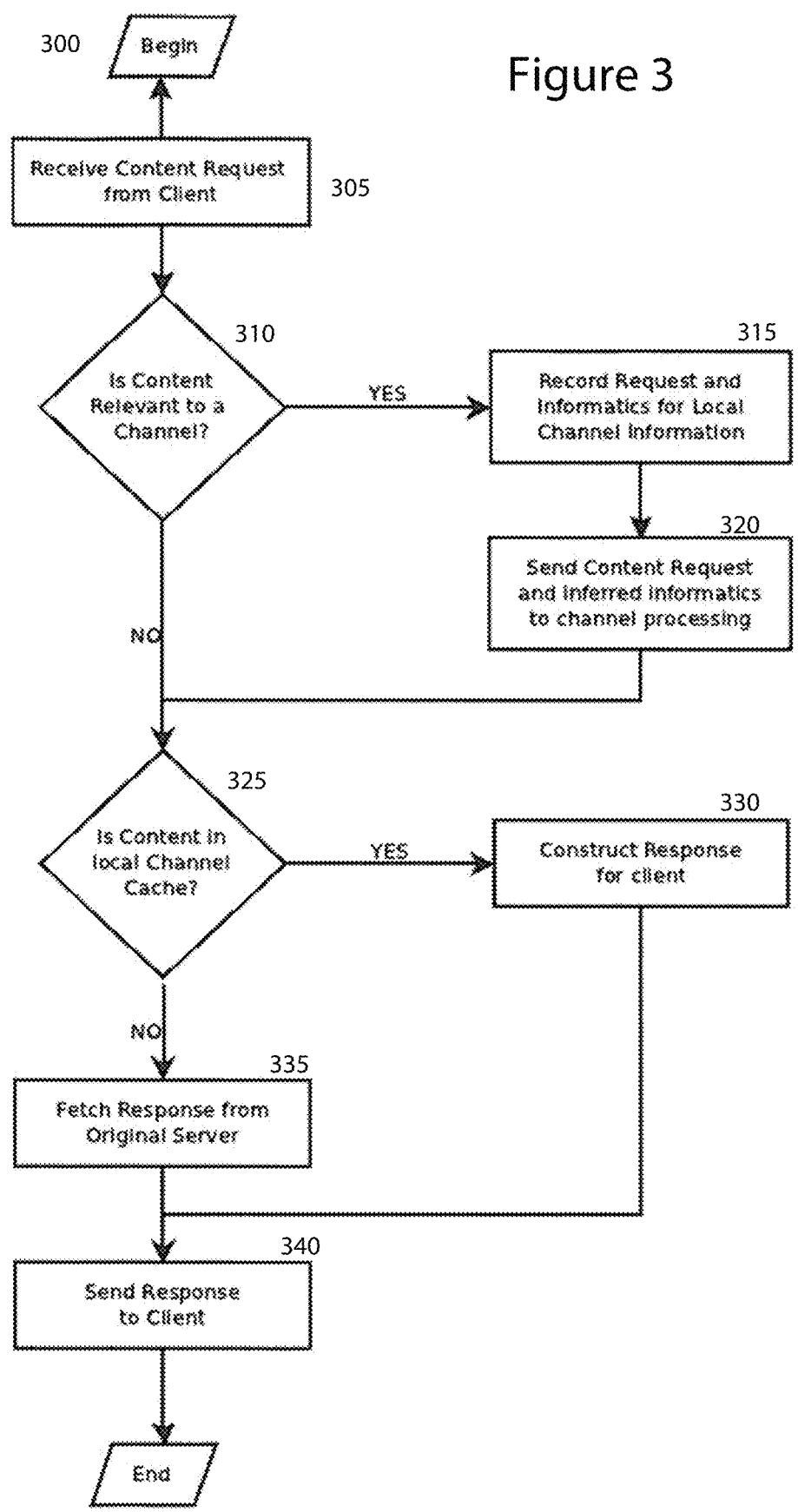
FIG. 3 illustrates a web proxy process in accordance with the present invention.

Referring next to FIG. 3, an exemplary process by which an embodiment of the system of the present invention responds to content requests can be better appreciated. The process begins at 300, and at 305 a content request from a client, or consumer device, is received. At step 310, the request is evaluated to determine if the requested content is potentially relevant to any channel, based on rules dictated by the central processing cluster 135 or manually assigned to a local network appliance 105. While the embodiments shown in FIGS. 1 and 3 include a central processing cluster, it will be appreciated that not all embodiments require such a cluster.

If the requested content is potentially relevant to a channel, the request and associated informatics are recorded at step 315 for local channel information, and the content request and inferred informatics are sent, at step 320, to channel processing. In some embodiments, such informatics can take a number of forms depending upon the particular implementation. For example, the informatics can comprise a combination of all or a part of the request data transmission, together with any information that has been accumulated on the local appliance regarding customer demographics for that appliance, as well as that appliance's location on the network. "Location" in this case can comprise a relative measure of historical bandwidth to customers and content servers, as well as whether the network is configured with another local appliance either upstream or downstream of the local appliance in question.

If the content was not relevant to a channel, or after completion of step 320, a check is made at step 325 to determine whether the requested content is already maintained in the local channel cache If the content is maintained on the local cache, a response to the client is constructed at step 330. If the requested content is not maintained on the local channel cache, then the response is fetched from the original server, as shown at step 335. Whether the response (or content) is fetched from the original server in accordance with step 335, or constructed from the local cache in accordance with step 330, the response is sent to the requesting consumer device at step 340.

It will also be appreciated by those skilled in the art that, in some embodiments, it is desirable to maintain some non-channel content on the same local storage 110 as the channel content. For example, frequently accessed images such as icons, bullets, etc., need not be included in the channelization process of the present invention, but, by being available locally, can still provide accelerated delivery which results in a "snappy" feel to the user.

Figure 4A:
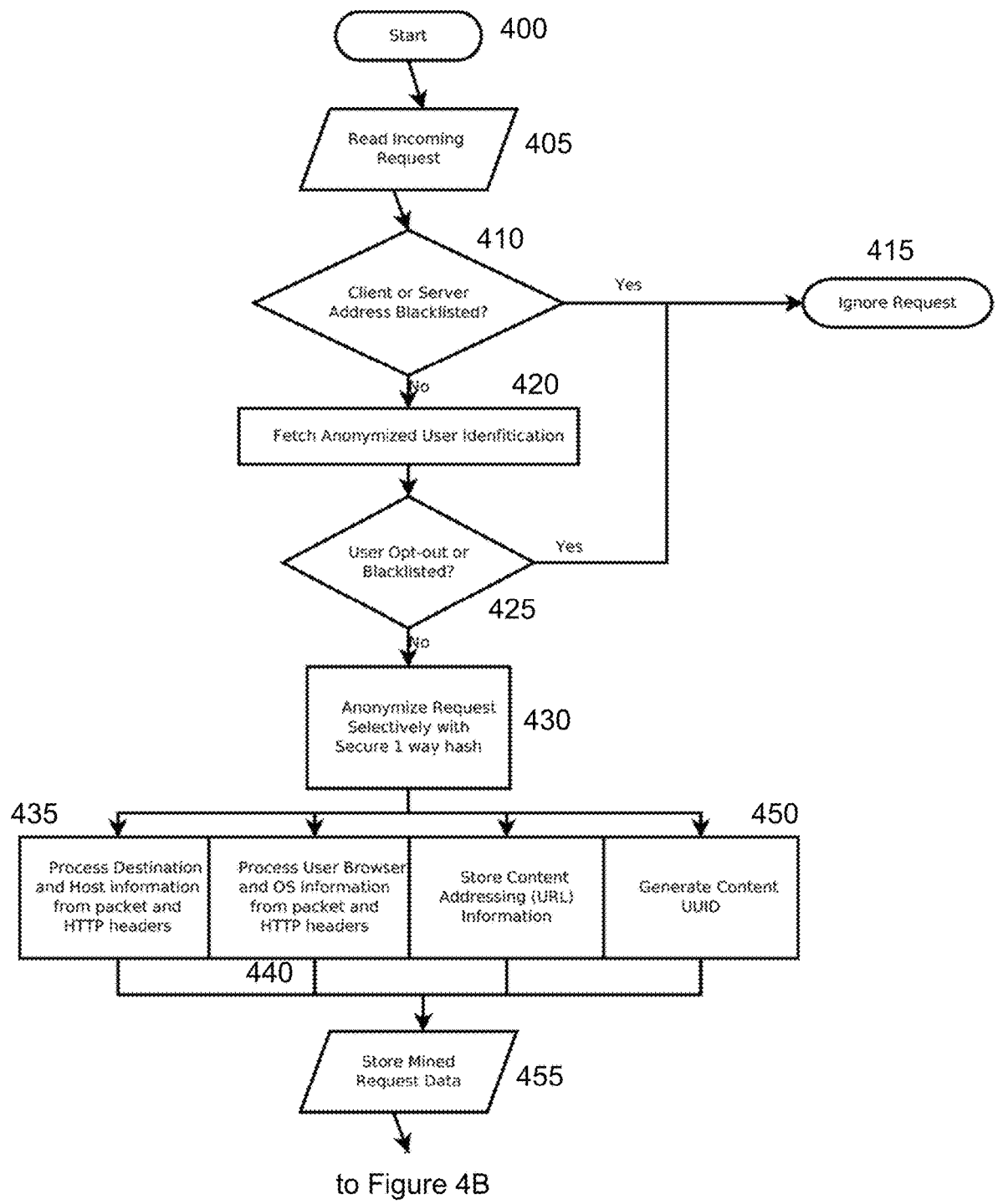
FIGS. 4A-4B illustrate the data mining process of the present invention.
Figure 4B:
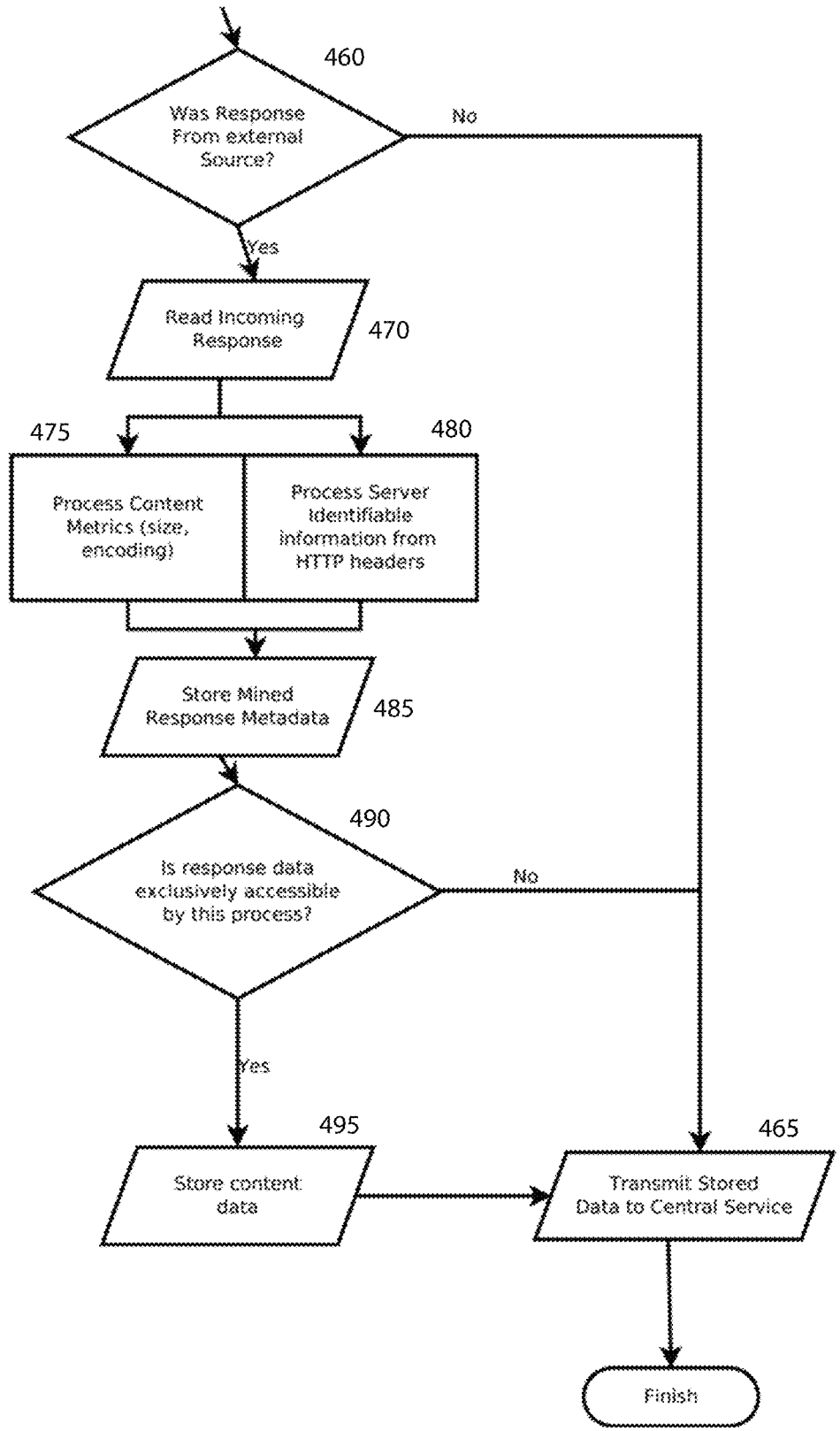

Referring next to FIGS. 4A and 4B, the method by which incoming requests cause the requested content to be aggregated into channels can be better appreciated. The process of FIGS. 4A and 4B is, in at least some embodiments, performed on the local network appliance 105 (FIG. 1). Alternatively, in other embodiments, at least the majority of the process can be performed on the remote central cloud processor. For convenience, the remainder of the discussion of FIGS. 4A-4B will assume that the processing occurs on the local network appliance.

With the process starting at 400, the incoming request from the consumer is read at step 405. A check is made at 410 to determine whether either the address of the client requesting the content or the address of the server is blacklisted; if so, the request is ignored as shown at 415. However, if not, user identification is fetched at 420. The user identification is typically blurred to ensure that personal data is not retrieved or stored, while at the same time providing sufficient location information and a relatively unique but irreversible means to identify groups of users for trend analysis such that the request can be evaluated for inclusion in a channel. In some embodiments, if the user has opted out, or is blacklisted, as shown at 425, the request is ignored. If the user has not opted out and is not blacklisted, then the content request is selectively anonymized through the use of a secure one-way hash, as shown at 430. It will be appreciated by those skilled in the art that it is, in general more desirable to perform such blurring at the local appliance, rather than the central cloud, to better protect user information against improper, or at least undesirable, disclosure.

At this point, several things can occur, substantially although not necessarily in parallel, and not necessarily in any order: (1) the destination and host information is identified from the packet and protocol headers, HTTP as an example, shown at 435; (2) the user's browser of operating system information is processed at 440; (3) content addressing information (i.e., URL or variant thereof) is stored at 445; and, (4), content UUID is generated at 450. While HTTP protocol is commonly used for network transmission, other protocols are acceptable. The data mined from the request is then stored at 455. The process continues on FIG. 5B with a check at step 460 to determine whether the response (i.e., the requested content) was retrieved from an external source. If not, the content already exists in the local storage, and so the process advances to step 465, where the stored content is transmitted to the central service and the process finishes.

If, on the other hand, the response was from an external source, indicating that the requested content did not exist on the storage of the present invention, the response received from the external source is read at 470, at which point two events occur: (1) the content metrics are processed at 475; and, (2) server identifiable information is processed from the protocol headers associated with the response, indicated at step 480. That mined metadata representing the content of the response is then stored at step 485. A check is then made at step 490 to determine whether the response data can be retrieved through any other process. If the data cannot be retrieved from another process, this indicates that the content is exclusively accessible by the process by which it was retrieved the first time. In such instances, the content is stored at step 495 and later transmitted to the central processing cloud 125, since, by definition, that content would not otherwise be available. At that point the requested content is transmitted to the consumer who requested it, as shown at step 465, although it will be appreciated that the transmission to the consumer need not wait for the transmission to the central cloud to complete.

The check done at step 490 reflects situations where data is subject to geographical or other limitations, typically imposed by the source of the data. For example, various servers operated by large companies frequently redirect a request to localized servers, which prevents a consumer from accessing data maintained on a remote server even though that data is what is desired by that particular user. Likewise, other website operators time-stamp their data to cause it to be released at a certain time, and impose restrictions which prevent the data from being accessed from different time zones in a way that would get around such release restrictions. While the time stamp restriction can affect when the data is released to consumers, if the objective is to provide the user a rapid response, it can be desirable to cache the time stamped content ahead of the release time, so that it is immediately available to consumers, with the rapid throughput of the present invention, as soon as the time lock associated with the time stamp is released. However, if the data is available from other sources it is generally more efficient for the central processing cloud 125 to fetch the content directly from the original content server 155 and no burden is placed on the local network appliance 105 to transmit the data along with the metadata.

Figure 5:
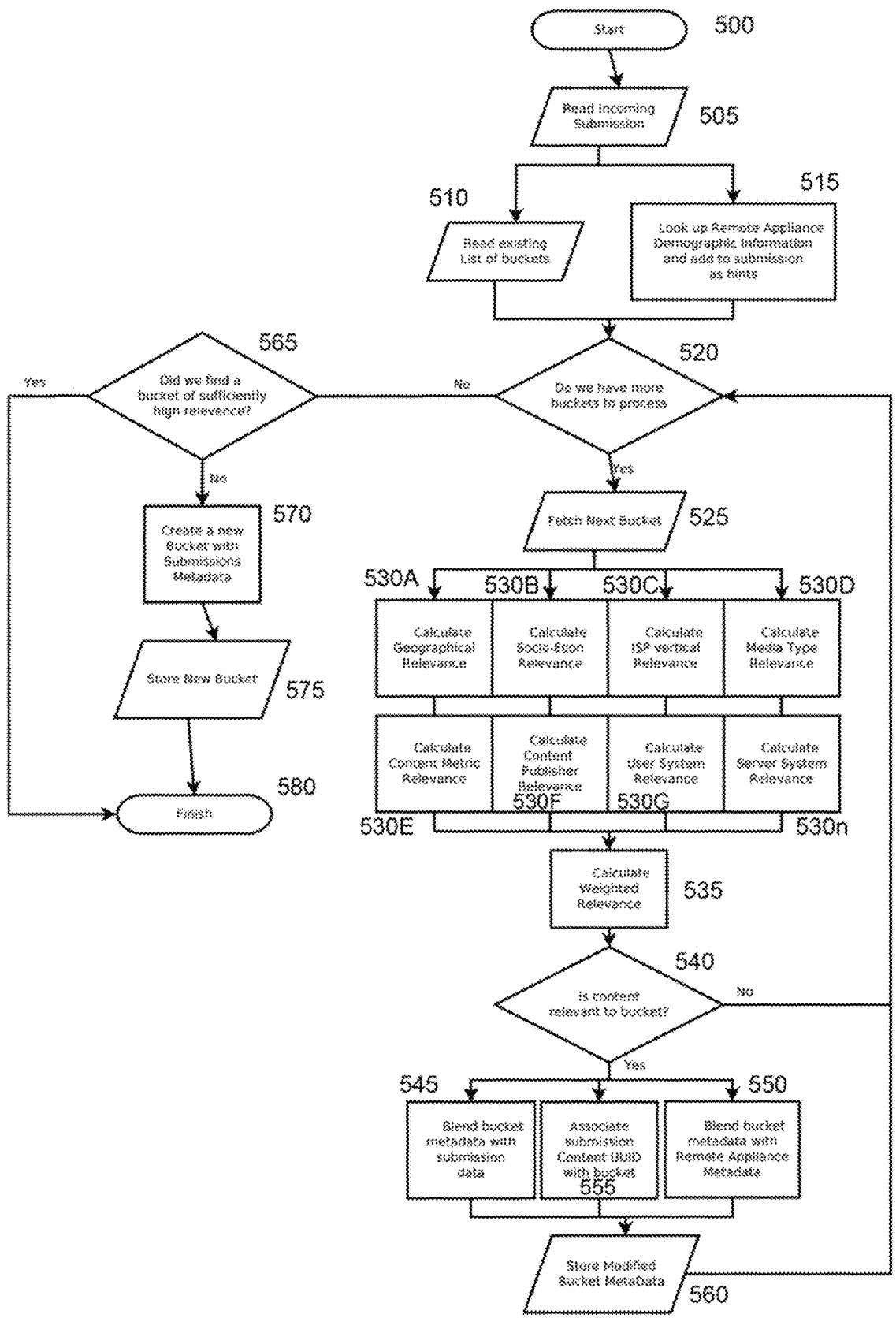
FIG. 5 illustrates the central data process by which content is aggregated into channels.

Referring next to FIG. 5, the process begins at step 500, and the incoming submission is read at step 505. At step 510, the existing list of channels (i.e., content that has previously been aggregated as likely to be requested by a particular group of users within a cohesive edge network 115) is read. Likewise, as shown at step 515, demographic information associated with the network appliance 105 which has generated the current request is reviewed. That demographic information is historical data, developed based on prior requests that have been filtered by, for example, the process of FIG. 5, and then associated as metadata back to the remote network appliance that generated the current request. The metadata thus evolves as sufficient numbers of additional requests for content are processed. The metadata creates a basis for developing figures of merit regarding relevancy of a particular request to existing channels, which can be further refined by the remaining steps of the process shown in FIG. 5.

From step 510, there will be a list of channels of aggregated content with which to compare the newly-received request for data, to determine whether to include the newly-requested content in a particular channel. In an embodiment, each of the channels can be processed sequentially, in accordance with the process shown beginning at step 520, which simply checks to see if there are more channels to compare to the incoming content request. If there are more channels to process, as there will be on the first iteration, the next channel is fetched at step 525.

At this point, a plurality of filtering criteria are applied as shown at 530A-n, and it will be appreciated by those skilled in the art that the list illustrated in FIG. 5 is not exhaustive. Among the criteria which can be used to ascertain relevance to a particular channel of previously-aggregated content can be: geographical relevance, which is relatively weak in and of itself, but can be useful for trend and distribution analysis; socio-economic relevance, also a relatively weak indicator of relevancy but which can evolve over time. For example, if a large number of requests are received that are determined to be associated with high end retail, over time the channel content will tend to adjust the criteria of the particular channel to reflect the users' choices. The socio-economic data can be derived from various steps in the process of FIG. 5A-B, including the data developed in steps 440 and 445, among others.

At step 530C, ISP vertical relevance is examined, which can be a moderately strong indicator of relevancy of the newly requested content to that already aggregated in a particular channel. Examples could include a newly received request from a five-star hotel's network, where the channel already includes content that is often requested on other five star hotels' networks, or the newly-received request originates from a particular student housing facility, where requests relevant to other student housing facilities are already stored in the channel.

Media type, shown at 530D, can be a strong indicator of relevancy. For example, web-video forms tends to correlate to other web-videos. However, the factor can evolve as in, for example, food related web videos may, over time establish better coherence with food blogs than simply other "web videos."

Content metrics, shown at 530E, can also provide some relevance, as well as providing some sense of developing trends: for example, a trend that web video sizes are increasing can allow better planning for logistics and infrastructure.

Content publisher, shown in 530F, can be a strong indicator of relevance, because publishers tend to be single audience. For example, if a particular server gets substantial volumes of request for Huffington Post, adding all Huffington Post content probably ensures high cache hits, even though other criteria may not be met.

User System relevance 530G and Server system relevance 530H are relatively weak indicators of relevance, and mostly monitor trends in technology adoption, whether from the user side or the publisher side. As noted above, other criteria can also be used. Likewise, the criteria 530A-n are each independent, and the particular arrangement shown in FIG. 5, where one group is shown ahead of the other, is simply for convenience and is not intended to be limiting.

Once the results of the various filters are obtained, a weighted relevancy is calculated, as shown at step 535. The particular weighting can be determined in any suitable manner, and can vary with the particular implementation. Then, at 540, a check is made as to whether the newly requested submission is relevant to the channel being examined. Thresholding or other criteria can be used to determine whether the result of the weighting step should be a basis for adding the new content to a channel, or not. If not, the process loops back to the next channel. If the new content is considered relevant to a channel, the submission metadata is blended with the pre-existing channel metadata at step 545, to permit the channel metadata to evolve to better reflect the user's choices, and thus increase the likelihood that the cache (the local content store) will already have the content a user requests by the time he requests it. The blending process typically uses a "damped spring" algorithm, with iterative relaxing or increasing of the factors for the various filters, until the general "error" in the channel is minimized; or, said in a different way, until the cache hit rate approaches 100 percent.

In addition, at step 550, the channel metadata is blended back to the remote appliance metadata, to enhance the accuracy of associating channels to remote appliances, and supplying those channels with new content as that content is discovered. To facilitate the blending which occurs in steps 545 and 550, the unique ID assigned to the newly requested (and now evaluated) content is associated with the channel to which it is deemed relevant. The modified channel metadata is then stored at step 560, and the process loops back to step 520, to evaluate the content with respect to the next channel in the list. It will be appreciated by those skilled in the art that a given item of content can be relevant to multiple channels, which can be thought of as "overlap" among the channels. In such instances, it is generally preferred to store that content on the local storage only once. In a feature of at least some embodiments of the invention, if, for example, "channel C" is a subset of the combination of "channel A" and "channel B", then channel C will not transmit as an independent stream if channels A and B are transmitting.

In the event that no channel is deemed relevant to a particular piece of newly requested content, as determined by a check at step 565, then a new channel is created at step 570 and stored at step 575, and the process finishes at step 580.

Figure 6:
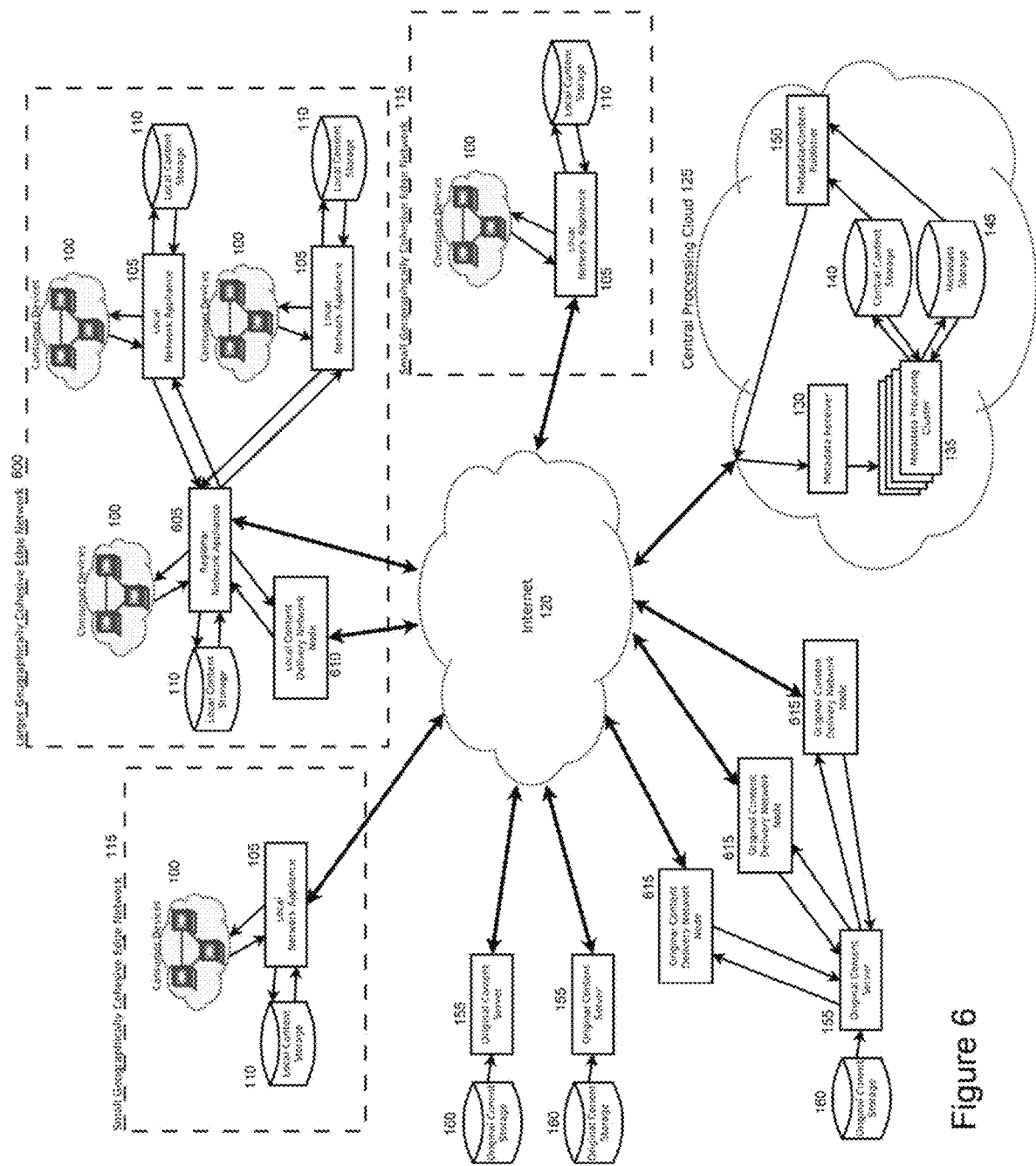
FIG. 6 illustrates a more robust version of FIG. 1, in which a plurality of local network appliances form a tiered network to provide channelized content to a plurality of associated multiple dwelling units or other consumers.

Referring next to FIG. 6, a more robust version of the network diagram of FIG. 1 is shown, where elements shown with like reference numerals operate in the same way. Thus, a plurality of cohesive edge networks 115 is shown, distributed geographically, with many more content servers 155. In addition, some of the cohesive edge networks are larger than others, as shown at 600 and can be connected to the internet through a regional network appliance 605 and node 610. Such a regional appliance operates to provide the local appliances 105 an augmented, "virtually local" content store. In operation, content that can be shared among multiple local appliances can be stored on the regional network appliance while maintaining the desired bandwidth since the local and regional appliances are, in at least some embodiments, maintained in a geographically cohesive network which provides the substantially instantaneous availability that is an aspect of several embodiments of the present invention. FIG. 6 further illustrates that, in some embodiments of the invention, it is possible for otherwise identical systems to operate efficiently in a hierarchical capacity. This permits a regional appliance to be tuned to (or store) channel content common among a plurality of local appliances, while permitting the local appliances to be tuned to content which is different from that stored on other local appliances, all with the result of better content coverage. It will also be appreciated from FIG. 6 that, in some instances, original content from servers 155 can be connected to the internet through one or more content delivery nodes 615.

Figure 7:
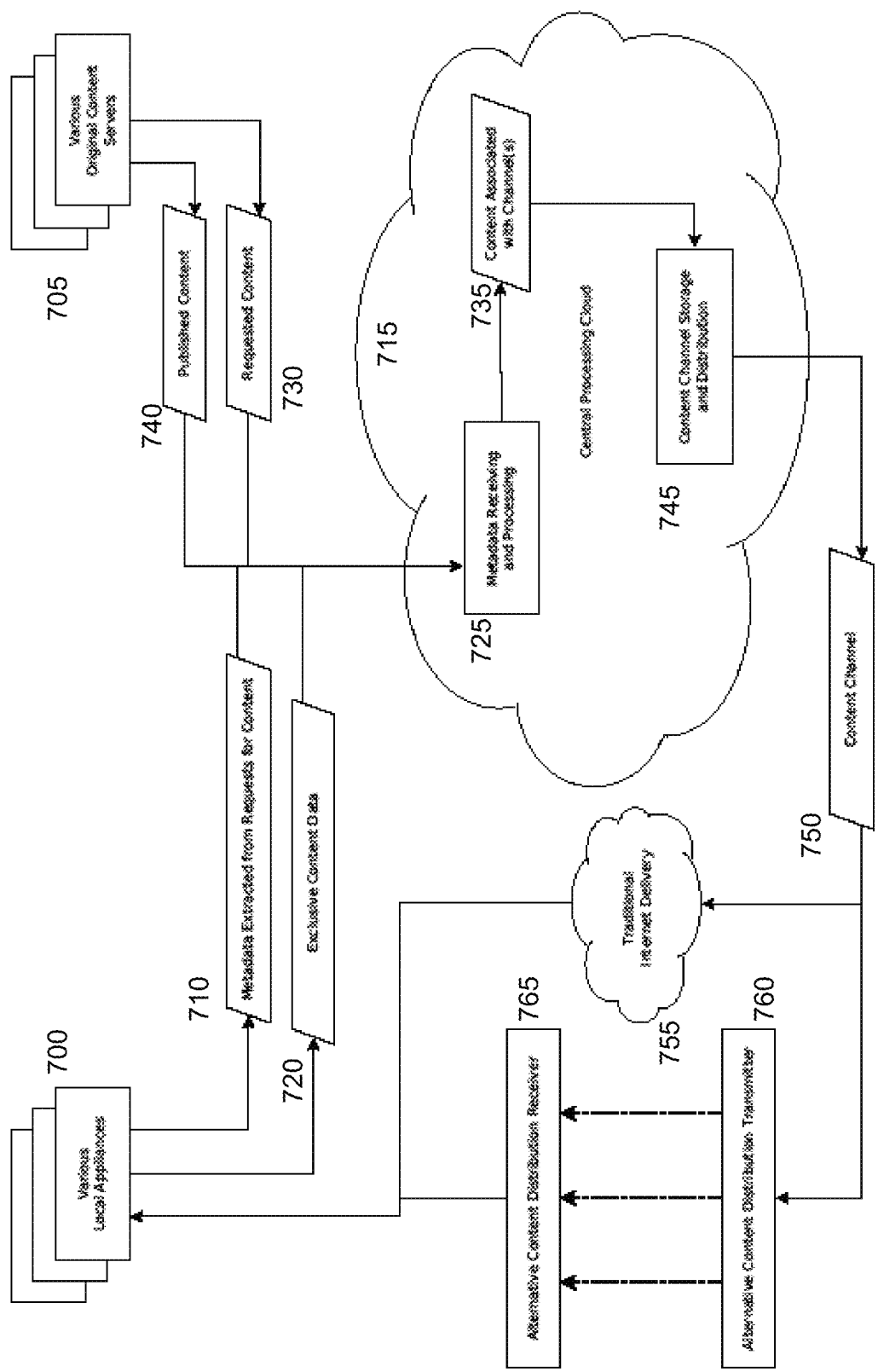
FIG. 7 illustrates the "life cycle" of content channelized for use by the present system.

Referring next to FIG. 7, the "life cycle" of the content, as managed by an embodiment of the present invention, can be better appreciated. In FIG. 7, each parallelogram represents as "state" of the content, while each rectangle represents a device that either acts on the state to change the content, or acts on the state to produce content. For the embodiment of FIG. 7, two sources of content exist: local appliances 700 (including their associated content storage, as shown at 110 in FIG. 1) and original content servers 705, such as third party websites. The remote appliances produce metadata 710 describing the content requested by a consumer (not shown), for example by the process shown in FIGS. 4A-4B, and that metadata is transmitted to the central processing cloud 715. In addition, if the requested content is only available to that local appliance, the local appliance also forwards the content itself, shown at 720, to the central processing cloud 715.

Original content servers 705 add content to the system either by servicing requests sent from the central processing cloud 715, or by publishing content directly to the system. The first situation occurs when the central processing cloud analyzes the incoming metadata (at metadata receiving and processing block 725) and determines that it should fetch content directly from the original content server 705. This occurs when the local appliance has determined that the requested content is not available solely through that local appliance, and so is the complement to step 490 (FIG. 4B), which can, in most embodiments, only be performed on the local appliance. The requested content 730 is thus fetched from the original content servers 705 and operated on by metadata receiving block 725, where the content is associated with a channel as shown by state 735.

The second situation occurs when content publishers push their content to the system in anticipation of that content becoming publicly accessible and in demand. In this instance the published content 740 may have little or no metadata associated with it as yet, but can still be served with the channels, and thus pre-seed the local appliances.

Content thus added to the system is also processed by blocks 725 and 735, as discussed in connection with FIG. 1, at 130 and 135, and associated with an existing or new channel as discussed in connection with FIG. 5. The content thus associated with a channel can then be transmitted for content channel storage and distribution, as shown at 745, as discussed in connection with FIG. 1, and particularly elements 140, 145 and 150 thereof. This permits long term aggregation and eventual channel publication as a content channel, shown at 750.

A content channel is the transformed and aggregated content that is destined for delivery to a local appliance, in order to achieve a key aspect of some embodiments of the invention, which is to have the content that consumers want locally available before they request it. The distribution method by which that channel of content is delivered to the local appliance can be any suitable method known in the art, and is, most commonly, the traditional internet infrastructure of point-to-point distribution, shown at 755. Alternatively, multicasting techniques such as satellite multicasting can also be used, which require appropriate transmitters and receivers such as shown at 760 and 765, respectively.

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

We claim:

1. A method for deriving ontological relevancies of digital content to provide the content to a client device connected to a local network at extremely fast data rates without at least some of the delays and latency associated with conventional internet downloads comprising the steps of:

evaluating, in a metadata processing cluster in a central processing cloud, for at least some content available across a network from an original content server, metadata associated with that content available from that original content server, processing, in the central processing cloud in response to the evaluating step at least in part using predictive algorithms on the result of past usage characteristics of at least some users associated with the central processing cloud, content that is likely to be desired for download at a network location sufficiently remote from the original content server that a request to the original content server will result in significant latency in delivering that content to a user, evaluating, in a computer, new requests for content to identify content of a type that does not need to be placed into one or more channels, and storing other requested content into one or more channels configured to be stored on a local content store located more proximate to a user device than the original content server and connected substantially locally thereto such that at least a portion of the requested content on the local content store is delivered to the user device without the delays and latency typical of conventional internet downloads.

\* \* \* \* \*